Fig.1.

March 1, 1949.    H. MARTIN    2,462,882
METHOD OF ELECTRIC WELDING METAL STUD-LIKE
ARTICLES TO METAL PLATE-LIKE BODIES
Filed May 19, 1944    6 Sheets-Sheet 2

Fig. 2.

Inventor
H. Martin
by
W. E. Evans
Attorney.

Fig.3.

March 1, 1949.                H. MARTIN                2,462,882
       METHOD OF ELECTRIC WELDING METAL STUD-LIKE
              ARTICLES TO METAL PLATE-LIKE BODIES
Filed May 19, 1944                            6 Sheets-Sheet 4

Inventor
H. Martin:
by
W. E. Evans.
Attorney.

Inventor
H. Martin
by
W. E. Evans
Attorney

Patented Mar. 1, 1949

2,462,882

UNITED STATES PATENT OFFICE 2,462,882

METHOD OF ELECTRIC WELDING METAL STUD-LIKE ARTICLES TO METAL PLATE-LIKE BODIES

Harold Martin, Chatham, England

Application May 19, 1944, Serial No. 536,272
In Great Britain November 10, 1942

Section 1, Public Law 690, August 8, 1946
Patent expires November 10, 1962

5 Claims. (Cl. 219—10)

This invention relates to a method and apparatus for the electric arc welding of metal studs, tubes and the like to metal plates, bodies and the like and more particularly to the welding of steel or steel alloy studs to steel or steel alloy surfaces.

The arc welding of steel studs to steel plates is a difficult operation for the reason that in view of the high current density required satisfactorily to melt a steel stud the oppositely disposed heated part or crater of the plate acquires a state so closely approaching the molten that, with the increase in the welding current density produced on the shortening of the arc by the return or movement of the stud to the plate, a molten crater is formed for the reception of the stud with the result that the molten metal is scattered by the impact of the stud and a porous and frequently a partial weld of the stud to the plate is produced, mainly by reason of the scattering of the molten steel in globules under the impact of the stud.

In the case of steel stud welding the delay after the striking of the arc before the stud is applied to the plate is relatively short. It may be, for example, in the case of a quarter inch diameter stud, only about one quarter of a second. Thus, extremely rapid response of the source of current supply is essential.

Further, it is necessary that the conditions as regards the control of the current at the time of impact shall be capable of considerable variation. Thus, when steel studs of relatively small diameter are being welded, the exact control of the heat conditions at the instant of the application of the stud to the plate is of great importance and is difficult by reason of the relatively large peripheral zone of cooling in relation to the heated area of the plate and the total heat that is applied by way of the arc. In the case of large steel studs the arc striking conditions including the minimisation of the length of the arc are of relatively greater importance for at the moment of completing the weld the heat control requirements are different owing to the necessarily greater heat supplied in relation to the surrounding cooling zone.

The present invention has among its objects to provide for the arc welding of metal studs to metal plates in an effective and efficient manner, to enable such welding also to be effected with an alternating current supply, to provide portable apparatus adapted for the welding of steel studs to steel plates and like surfaces to ensure a homogeneous weld without scattering of molten metal from the crater of the plate; and, in under-water stud welding, to ensure conditions favourable to a satisfactory weld, to prevent the scattering of molten metal by the steam generated, to limit the generation of steam in the proximity of the weld and to constrain excess steam to flow away from the proximity of the weld without causing swirling or eddying effects.

The invention consists in a method of welding metal studs, tubes and the like to metal plates, bodies and the like, and more particularly steel and steel alloy studs to steel and steel alloy plates and the like, consisting in effecting the instantaneous and uniform formation of an arc between the stud and the plate, maintaining the arc through a predetermined period, then pressing the stud into contact with the plate while retarding the final movement of the stud to minimize impact and at a moment not later than the instant of contact of the stud with the plate so moderating the current passing through the stud as to ensure that on contact between the heated stud and the heated plate the heat of the arc crater of the plate is sufficient only to maintain the plate at the crater in a suitably plastic or fluid condition although the contacting end of the stud is relatively molten, and maintaining the passage of current through the stud until the weld is completed.

The term "instantaneous" is used with the meaning that the arc is started instantly, unhesitantly and smoothly, so that there is not the sluggish and uncertain striking that is common in welding operations of the kind and repetitions of the striking are uniform as to conditions.

The accompanying diagrammatic drawings and diagrams illustrate, by way of example, constructions of welding apparatus for applying the method of welding according to the invention and the corresponding control circuits.

Figure 7 is a diagram of an example of electrical circuits for an apparatus such as that represented in Figure 1, while

Figure 1:
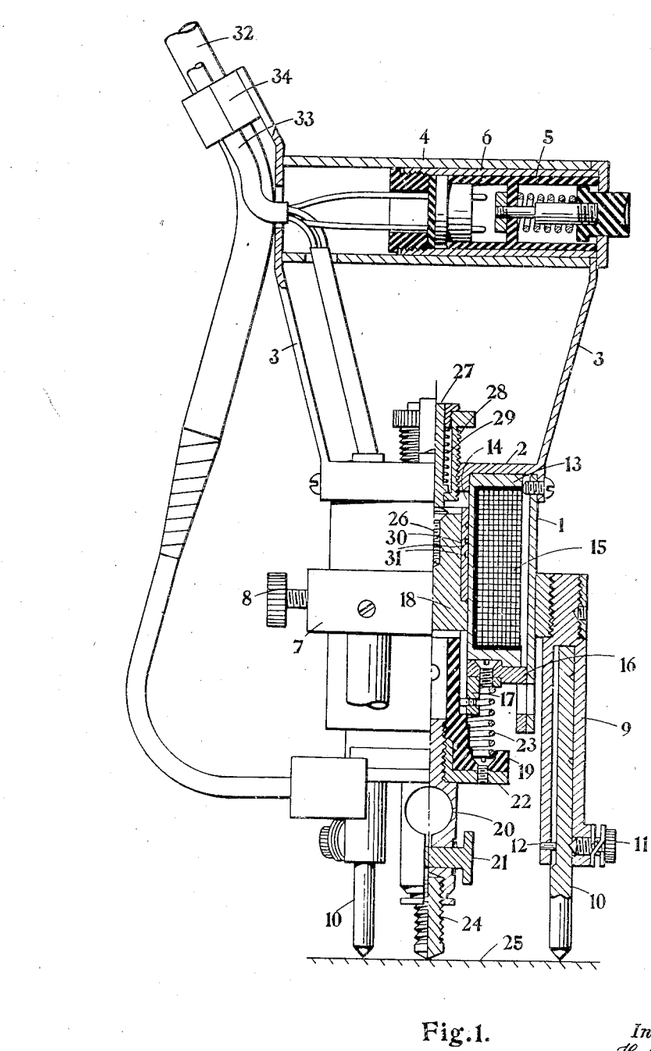
Figure 1 is an elevation, partly in section, of a portable direct current welding apparatus.

A portable welding tool for operation by direct current for applying the method according to the invention is illustrated, for example, in Figure 1 of the accompanying drawings. A cylindrical solenoid casing 1, which may be of mild steel, is closed at the upper end by a closure plate 2, also of mild steel, carying handle brackets 3 for a handle grip 4 in which is mounted a press switch 5 enclosed by a sleeve 6.

The casing 1 is surrounded by a collar 7 that may be of brass and is axially adjustable and secured in any position of adjustment by means of a locking screw 8 advantageously engaging in a channelled recess. The collar 7 supports three cylindrical guides 9, also of brass, in which are slidably mounted legs or supports 10, of mild steel, that may be locked in determined positions of adjustment by corresponding securing screws 11, each leg or support being prevented from rotation in the corresponding guide 9 by a locating pin 12 engaging a longitudinal channel in the leg or support.

The casing 1 contains a solenoid former 13 of non-magnetic material, such as brass, having a central bore 14 and supporting the solenoid coil 15 and its insulation. The former 13 is retained within the casing by means of an annular flanged throat plate 16, of mild steel, supporting a coaxial flanged guide ring 17, of brass, in continuation of the bore of the former 13. The solenoid core 18, which also is of mild steel, is slidably mounted within the former 13 and supports at the lower end, by way of a flanged cylindrical insulator 19, the slotted stud chuck 20 that is adapted to be engaged with the stud by means of a clamping screw 21, the chuck being connected to the insulator advantageously by means of a flanged connection ring 22. The solenoid core is prevented from rotating in the former by a locating pin engaging a longitudinal channel in the insulator. A coiled spring 23 embracing the insulator 19 abuts at the one end upon the flange of the insulator and at the other end upon the flange of the guide ring 17. The spring thus serves to move the solenoid core and the chuck in a direction to apply the stud 24 held in the chuck 20 against the plate 25.

The solenoid core 18 is provided with an axially disposed adjustable contact screw 26 that is adapted to contact with the indicating plunger 27 contained in the adjustable plug 28 that is mounted in the closure plate 2, the plunger 27 being moved against the action of the coiled spring 29 to indicate when the solenoid core is disposed at the correct position for the desired length of arc as determined by the setting of the plug 28.

The solenoid core 18 is provided with a sleeve 30 of copper or like non-magnetic and high conductivity metal that is a sliding fit within the former to ensure freedom of movement of the core and in order that the stud 24 may be applied to the plate 25 with a minimum of impact the sleeve 30 is advantageously grooved as at 31 for the reception of oil or grease to assist in the production by suction of a damping effect on the downward movement of the solenoid core under the action of the spring 23, the plug 28 and plunger 27 being fitted substantially air-tight.

The sleeve 30 also serves to damp or restrain the downward movement electromagnetically.

The supply and control cables 32 and 33 are secured in position by a clamp 34 fitted to an extension of one of the handle brackets 3. The conductors of the supply cable are connected to the connection plate 22, preferably in more than one position to secure satisfactory distribution of the current.

The end of the stud 24 to be welded is advantageously pointed to an angle of, for example, 120° and has a cylindrical surface for a distance of, for example, ¼ of an inch. The angular point and, if necessary, the cylindrical surface is or are metallized with aluminium to facilitate the striking of the arc.

It is preferred to employ a thin coating of aluminium applied upon the stud under heat by a recognized metallization process. Such metallization of the stud is of advantage in facilitating the striking of the arc in any method of electric arc stud welding and more particularly when the stud is withdrawn from the metal surface to which it is to be welded to strike the arc.

Figure 7:
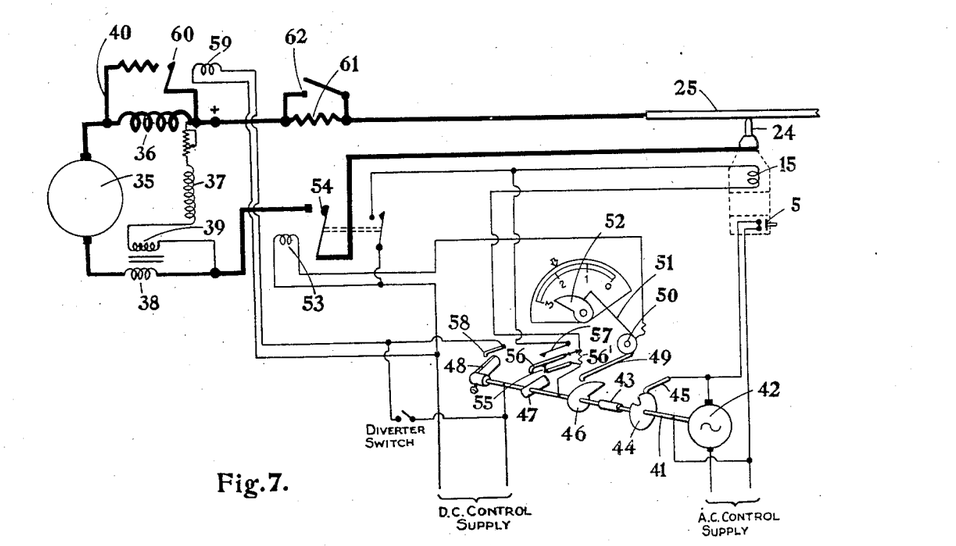

Suitable electrical connections for the apparatus represented in Figure 1 and for applying the method of the invention are illustrated in Figure 7 of the accompanying drawings by way of example. The direct current generator having the armature 35 is provided with series and shunt field coils 36, 37 and the primary 38 of a transformer may be included in the main or welding circuit with the secondary 39 of the transformer in series with the shunt field coil 37. The series coil may be shunted by a diverter circuit 40 the operation of which is automatically controlled in common with the operation of the apparatus in general. For this purpose there is provided a timing apparatus comprising a cam shaft that is rotated at a uniform speed by the rotor 42 of a synchronous alternating current motor, the shaft being provided with a non-conducting section 43 so that it may be included in two distinct control circuits. The shaft carries a circular cam 44 that is slotted or gapped at one position in the circumference and that is connected across the rotor 42 through a wiping contact 45 in parallel with the control circuit from the push switch 5. Thus, when the push switch is operated, the rotor of the motor is set in rotation and the cam 44 is thus rotated to engage the wiping contact 45 and maintain closed the motor circuit for the complete cycle of operations, notwithstanding the release of the push switch 5. The second part of the shaft 41, insulated from that carrying the cam 44, is provided to carry three cams 46, 47 and 48. The cam 46 is advantageously of a form to impart a uniform movement for a determined angle of rotation and is adapted to co-operate with a wiping contact 49 having a pivotal movement about the axis 50 and whose initial position is determined through the arm 51 by a control cam 52 of a form similar to that of the cam 46 and that is adapted for manual adjustment for the setting of the duration of maintenance of the arc. Thus, according to the setting of the control cam 52 the contact 49 is moved towards or away from the cam 46 so that the latter engages the contact at an earlier or later moment in the rotation of the shaft 41. The contact 49 is connected in the circuit of the coil 53 of a contactor 54 adapted to close the main welding circuit and also the supply circuit for the coil 15 of the solenoid of the apparatus. These circuits are supplied from a direct current control supply.

The cam 47 serves to co-operate with three contacts 55, 56 and 57, two of which 55, 56 are normally in contact to short-circuit a limiting resistance 56¹ of small value, adapted to reduce the current demand upon the control circuit when the solenoid coil 15 is short-circuited for the movement of the stud to the plate. The contacts 55, 56 are separated by the cam 47 which engages and throws the contact 56 into engagement with the third contact 57. By such means the circuit of the solenoid coil 15, closed by the contactor 54 has the resistance 56¹ first inserted and is then short-circuited when the stud 24 is required to be returned to the plate 25 by the spring 23. The cam 48 serves to co-operate with a wiping contact 58 that is included in the circuit of the coil 59 of a contactor or switch 60 controlling a diverter circuit having the effect of reducing the density of the current at the moment just preceding the contacting of the stud with the plate.

The diagram also illustrates the provision of a resistance 61 for insertion in the main welding circuit for the purpose of reducing the density of the current on the return of the stud 24 to the plate 25. Such resistance may be normally short-circuited by a switch or contactor 62 that may be controlled in a manner similar to that hereinbefore described, by way of a cam on the control shaft 41 and a corresponding contact. When welding small studs by the use of a heavy capacity generator a current limiting and regulating resistance may also be employed.

In the operation of the portable welding tool represented in Figure 1 of the accompanying drawings, the tool is first adjusted, according to the kind of stud 24 being welded, for convenient disposition in relation to the plate 25, by adjustment of the length of the legs or supports 10, and, if necessary, of the position of the collar 7 upon the casing 1. A stud having been fitted in the chuck 20, the legs 10 of the tool are pressed upon the plate 25, thus pressing inwardly with respect to the casing 1 the chuck 20 and the solenoid core 18, and the plug 28 is adjusted until the plunger 27 contacts the contact screw 26 with its outer end flush with the surrounding face of the plug, thus determining the length of the arc. The button of the push switch 5 may then be depressed, thus initiating the cycle of operations by setting in rotation the rotor 42, which, by reason of the use of the cam 44 and wiper 45, continues to rotate to complete a revolution though the switch 5 is no longer closed. At the moment determined by the control cam 52, as set for the required duration of the arc, the welding circuit and the circuit for the solenoid coil is short-circuited to enable the spring 23 to take charge of the chuck 20. The spring moves the chuck to press the stud upon the plate but the movement is retarded by the suction and electromagnetic effects exercised by the sleeve 30 carried by the solenoid core, so that the impact of the stud upon the plate is minimized. Immediately before the stud contacts the plate the current density in the welding circuit is reduced to secure the required relative conditions of the end of the stud and the crater of the plate conducive to an effective weld in the manner hereinbefore described.

A welding tool such as is illustrated in Figure 1 may be modified for use with alternating current if provision is made for overcoming the difficulty in striking the arc by withdrawing the stud from the plate, in the manner hereinafter described.

Figure 2:
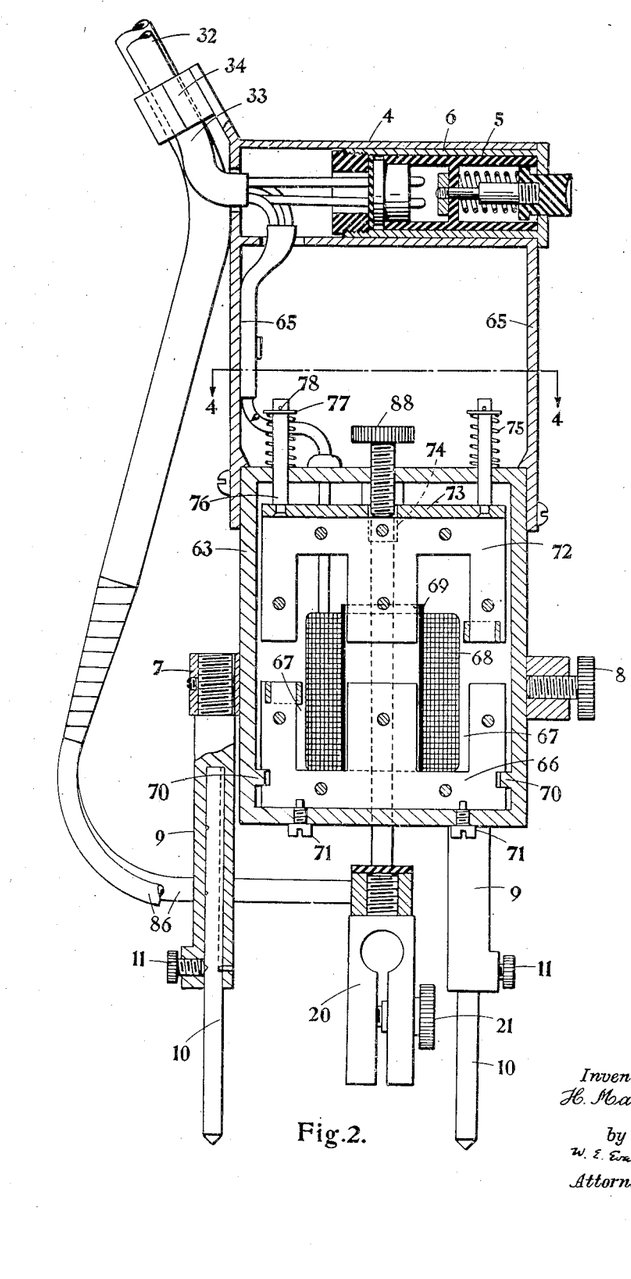
Figure 2 is a sectional elevation of a portable alternating current welding apparatus.
Figure 3:
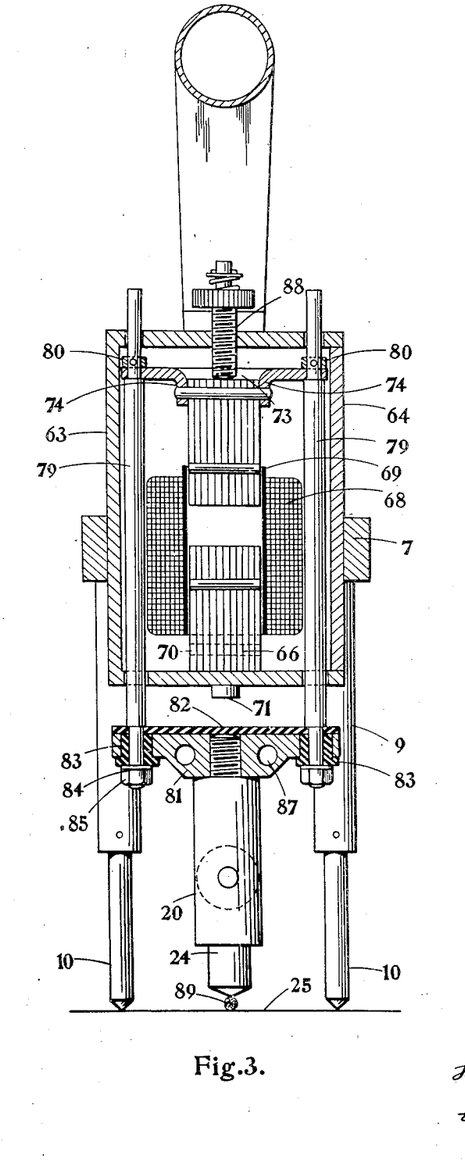
Figure 3 is a transverse sectional elevation of the welding apparatus represented in Figure 2.
Figure 4:
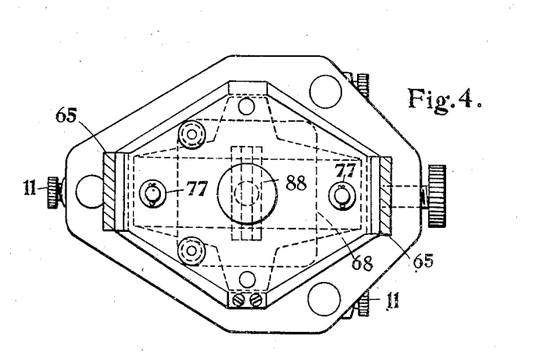
Figure 4 is a section taken on the line 4—4 of Figure 2.

A portable welding tool, more particularly for operation by alternating current and that does not withdraw the stud from the plate for striking the arc is illustrated in Figures 2 to 4 of the accompanying drawings. For the purpose of moving the stud to the plate in effecting the weld, the apparatus is provided with a solenoid instead of a spring. The apparatus comprises a body or solenoid casing 63, which may be of non-magnetic metal or alloy, such as brass, and is, in plan, of a lozenge shape having the angles removed. At the one side is provided a removable door or plate 64. At the upper end the casing is provided to receive the handle brackets 65 which may be integrally formed with the handle grip 4 within which is housed the sleeve 6 forming the casing or body for the push switch 5. The casing 63 is further adapted to be embraced by an adjustable supporting frame or collar 7, with locking screw 8, guides 9 and legs or supports 10, locked in the required positions of adjustment by the screws 11.

Within the casing 63 at the lower end there is mounted a fixed solenoid core 66 consisting of rectangular laminations of a steel alloy riveted together and slotted to provide recesses 67 in which may be fixedly received the solenoid coil 68 on a former 69 which may be of a phenol-formaldehyde condensation product or like thermal-setting substance. The core 66 is maintained in position in the casing 63 by the engagement of transverse slots of rectangular cross-section formed in the end faces of the core with corresponding ribs 70 formed on the inner surfaces of the end walls of the casing and by means of locating screw 71 in the bottom of the casing.

A movable solenoid core 72, similar in construction to the core 66, is supported within the upper part of the casing 63 upon a bridge plate 73 that in shape may follow the cross-sectional shape of the casing and that is slotted at the middle to permit the formation of the downwardly turned lugs 74 to which the core 72 is riveted. The core 72 and bridge plate 73 are resiliently supported by springs 75 coiled about posts 76 that are mounted on the bridge plate and pass freely through clearance holes in the top plate of the casing 63. The springs 75 abut against washers 77 and retaining pins 78 carried by the posts 76 and thus are compressed under the weight and downward movement of the core 72, which they support and counterbalance.

The cores 66 and 72 may be provided with shading rings, which may be of brass, upon the outer limbs of the two cores in oppositely or diagonally disposed positions.

The bridge plate 73 further supports two rods 79, retained by pinned collars 80, that pass through clearance holes in the top and bottom plates of the casing 63 and that support at the lower ends a connection head 81 of brass or other alloy or metal of good conductivity in which is mounted the stud chuck 20. The head 81 is insulated from the rods 79 by a cover plate or washer 82 and flanged bushes 83 of insulating material, such as a phenol-formaldehyde condensation product. The bushes 83 are secured in position by washers 84 and nuts 85 received upon the screw-threaded ends of the rods 79. The conductors 86 of the supply lead are respectively connected into the holes 87 of the head 81.

The setting of the chuck 20 according to the length of the arc required is determined by the adjusting stop screw 88 mounted in the top plate of the casing 63 and adapted to bear against the upper surface of the core 72 in opposition to the action of the springs 75. When the chuck 20 carrying the stud 24 is accurately set the distance separating the stud from the plate 25 is that necessary for the required length of the arc. For striking the arc when the welding circuit is closed the distance is advantageously bridged by a ball 89 of fibrous metallic material, such as steel wire wool. The ball or wad may be recessed into the end of the stud or may be attached in any other suitable manner, such as by means of a short spike-like projection. When the welding circuit is closed the fibrous metal insert is rapidly fused owing to its relatively high resistance and an arc is formed in the gap between the stud and the plate under conditions that give satisfactory and uniform arc formation.

Figure 8:
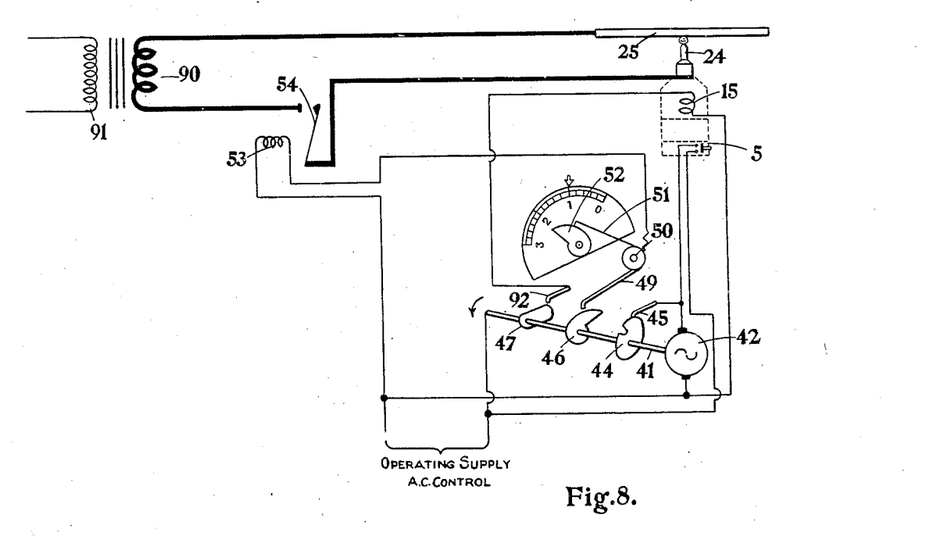
Figures 8 and 9 are corresponding diagrams for the apparatus respectively illustrated in Figures 2 to 4 and in Figures 5 and 6.

The use of a tool operating on an alternating current supply simplifies the control of the operation and usually requires only a transformer for the supply of the welding circuit. The use of a transformer also affords means for the control of the heat of the arc crater of the plate by reason of the inherently drooping characteristic resulting from the construction of the transformer and/or its accessory regulator and the operating conditions of such use. The control is advantageously effected as illustrated in Figure 8 of the accompanying drawings by the use of a timing mechanism similar to that described with reference to Figure 7. It is, however, not necessary for the shaft 41 to be in two insulated sections as the current for the control circuits is taken from the same source as the current for the motor 42. The cams 44, 46 and 52 and the contacts 45 and 49 have the same functions as the corresponding cams and contacts represented in Figure 7. The contactor 54 serves solely for the purpose of closing the main welding circuit through the secondary winding 90 of a transformer the primary winding 91 of which is connected to the main or other source of supply. The cam 47 has the modified function of closing the solenoid circuit through the contact 92 when the stud 24 is to be pressed home upon the plate 25. Control of the flow or limitation of the welding current at the moment of pressing the stud upon the plate may be effected by introducing impedance into the primary or secondary circuits of the supply transformer, under control and at the determined time by an additional cam and corresponding contact controlling a circuit whereby the impedance is cut in.

Figure 5:
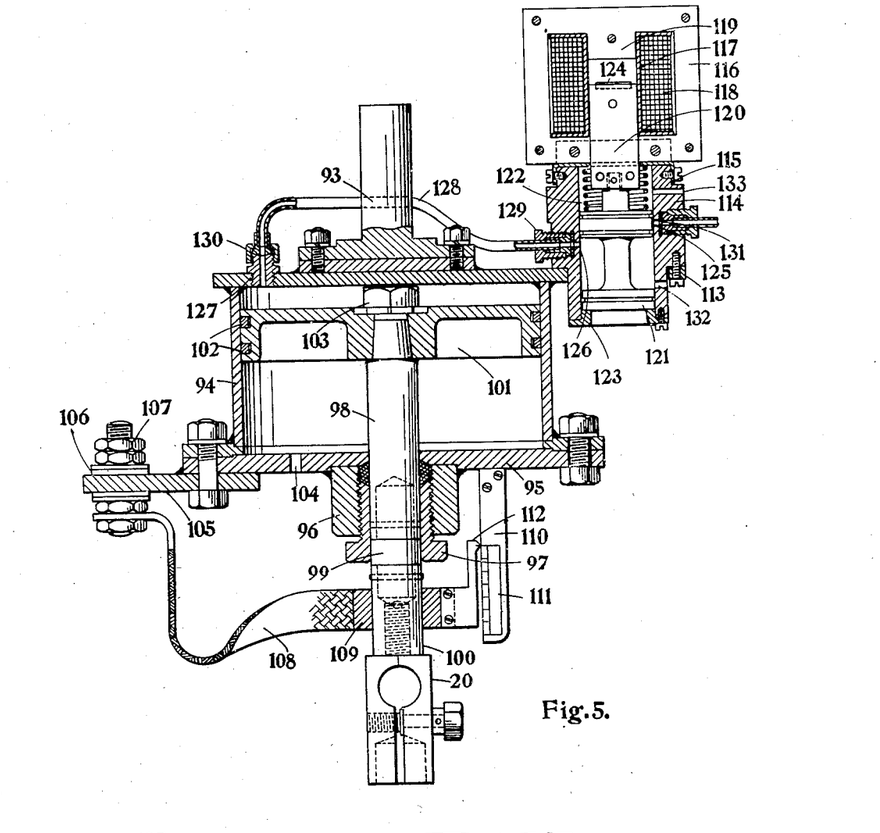
Figure 5 is a sectional elevation of an alternating current welding apparatus for use in a fixed position on the spindle of a machine tool, such as a drilling machine.
Figure 6:
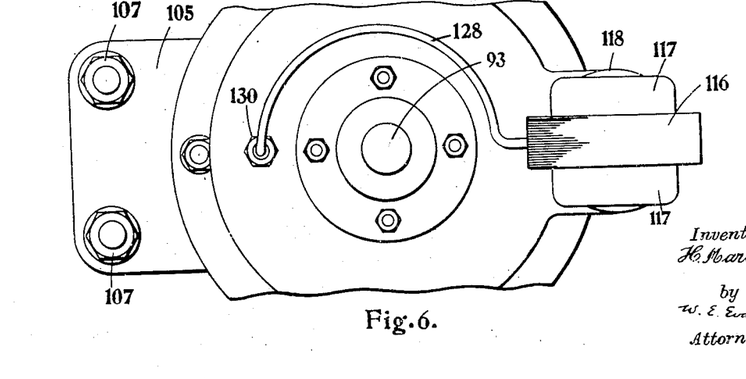
Figure 6 is a part plan view of the apparatus shown in Figure 5.

In the case of an alternating current apparatus that is not portable but is adapted, for example, to be mounted on a drilling machine or in some other fixed position, it is possible to use fluid pressure for effecting the movement of the stud to the plate for the weld. An apparatus of the kind is illustrated in Figures 5 and 6 of the accompanying drawings. A flanged adapter 93, for mounting in the spindle of a drilling machine or in a tool post is provided to support a fluid pressure cylinder 94 that may be built up of parts welded together, and is closed by a cover plate 95 fitted with a stuffing box 96 and gland 97 for a piston rod 98 that supports the stud chuck 20. The piston rod 98 has an inset insulating part or section 99 that is provided with coaxial plug-like parts for reception into corresponding recesses formed in the lower end of the rod 98 and the upper end of the rod extension 100 in which the chuck is carried. The piston 101, having piston rings 102, is secured to the upper end of the piston rod 98 by the nut 103.

The cover plate 95 is provided with an air vent 104 and carries a terminal plate 105 in which are mounted, in insulating bushes 106, the terminal bolts 107, whence current is supplied to the chuck 20 by way of plaited leads 108 to a connection block 109 that is in electrical connection, as by soldering, to the rod extension 100. In order that the position of the piston 101 in the cylinder 94 may be indicated at all times the cover plate 95 may carry an index post 110 bearing a graduated scale 111 against which is applied a pointer 112 supported by the connection block 109.

The control of the admission to the cylinder 94 of the fluid pressure medium, advantageously compressed air, is effected in known manner by way of a piston valve operated by a solenoid. For the purpose a lateral extension 113 of the end plate of the cylinder 94 supports a valve cylinder 114 which carries at the upper end a bracket member 115 to which is secured the solenoid laminations 116 that are riveted together. The form of the laminations is such as to provide a seating for a coil former 117 upon which is wound the solenoid coil 118 and a short downwardly extending fixed core 119 while affording clearance for the movable core 120 which is guided by the bracket member 115. The core 120 is connected to and adapted to lift a double piston valve 121 set in the cylinder 114. A helical spring 122 acts to return the piston valve 121 to its lowermost position, as determined by the stop ring 123. A shading ring 124, of brass or other non-magnetic material, is advantageously mounted in a recess in the upper end of the core 120 and may limit the upward movement by contacting with the core 119.

Compressed air is admitted to the cylinder 114 by way of a connection or union 125 which is obturated by the upper piston of the valve 121 when in its lowermost position and is supplied to the cylinder 94 by way of a passage 126 positioned below the said upper piston and communicating with an air admission fitting 127 on the cylinder 94 by the pipe 128 and unions 129, 130. The speed at which the piston 101 is moved, and thus the rapidity with which the stud is applied to the plate, may be determined by an exchangeable orifice plate 131, which may be mounted in the recess in which is received the connection or union 125. A vent 132 is provided in the wall of the cylinder 114 in a position to be covered by the lower piston of the valve 121 when in the lifted position, while a vent 133 releases air from above the valve 121.

Figure 9:
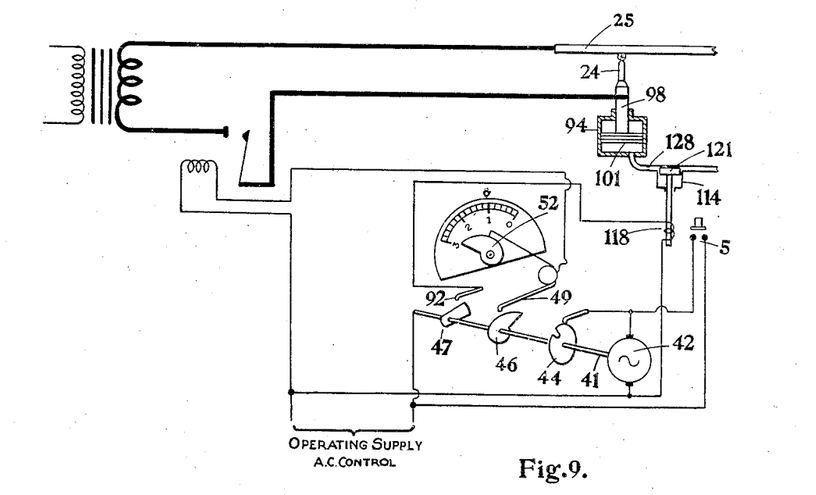

In the operation of the apparatus, the piston 101 having been set so that the stud is supported at the determined distance from the plate required for the length of the arc, the welding circuit is closed for the striking of the arc through any one of the agencies hereinbefore described and at the appropriate time the circuit of the solenoid coil 118 is closed to energise the core 120 and cause it to lift the piston valve 121. Compressed air is then admitted through the valve cylinder 114 to the cylinder 94 so that the piston 101 is moved downwardly for the application of the stud to the plate. These operations may be conveniently controlled, as represented in Figure 9, by timing apparatus substantially as described with reference to Figure 8, with the exception that the cam 47 and contact 92 now control the circuit of the coil 118 determining the actuation of the valve 121 instead of the circuit of a main solenoid.

In welding steel studs to steel plates under water by the methods hereinbefore disclosed it has been found that generation of steam due to the intense heat of the arc in or at the zone of the weld causes swirling or eddying effects which tend to scatter the molten steel particles formed by the arc in such a manner as to prevent a satisfactorily homogeneous and sealed or closed-up weld.

Figure 10:
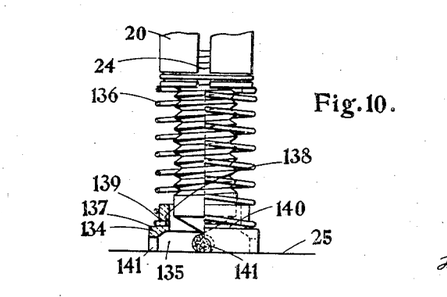
Figure 10 represents, partly in elevation and partly in section, an accessory element in the form of a sleeve or screening member for the stud, for use in underwater welding.

In applying portable welding apparatus of the kind hereinbefore described to under-water welding, therefore, a tubular sleeve may be provided to slide loosely over the welding end of the stud adjacent the plate, and the sleeve may be retained in contact with the plate during the welding operation by a light spring. As illustrated in Figure 10 of the accompanying drawings by way of example, the sleeve 134 is of a depth to surround the stud 24 when the stud is in the position away from the plate 25 during the maintenance of the arc. At the end which contacts with the plate the sleeve may have the bore enlarged in diameter to form a small annular recess or chamber 135 which not only limits the generation of steam and prevents excessive swirling or eddying in the region of the weld but also serves for the retention of the molten steel in and around the zone of the weld during the arc period so that scattering is thus additionally prevented and a sealed or closed-up weld obtained with a satisfactory fillet.

The sleeve or screening member may be of stoneware, porcelain, lava, or other suitable insulating material preferably of a refractory nature.

The sleeve or screening member 134 may be retained in contact with the plate by means of a helical spring 136 which may embrace the end of the stud holder 20 and may engage a peripheral groove or channel therein. The end of the sleeve or screening member 134 against which the spring 136 abuts may be shouldered externally, as at 137, to facilitate the fitting of the spring which may also be located and retained in position by means of a small radial hole 138 in which a short length 139 at the end of the spring bent radially inwards may be received. The sleeve is thereby retained by the spring and prevented from dropping off while the welding tool is placed in position for welding with the stud and sleeve in contact with the plate. The sleeve may be otherwise retained in engagement with the spring, as, for example, by the formation of a peripheral groove 140 in which the first coil of the spring may be received.

In order to prevent an excessive rise of steam pressure in the zone of the recess 135 adjacent the weld and to prevent tilting or lifting of the sleeve 134 from the plate, with consequent extrusion of molten metal, resulting in an irregular and/or not fully sealed-up weld, the edge or surface of the sleeve that is applied to the plate may be provided with two or more slots 141 or recesses in castellated formation through which may vent satisfactorily any excess steam which may be generated during the arcing stage of the weld. These venting slots may consist of one pair on opposite sides of a diameter, or may alternatively be two pairs disposed at right angles or else three in number, preferably uniformly spaced. The provision of four such slots is satisfactory in the case of downcast under-water stud welding to horizontal surfaces, but the use of only two appears advantageous in the case of under-water stud welding upon a vertical surface.

In the use of tools such as that represented in Figure 1 of relatively large capacity, it is advisable to provide a relief valve in communication with the cavity in which the solenoid core is received and which may become filled with water, in order to facilitate the striking of the arc.

The invention as defined by the claims that follow is not limited to the particular means of securing the essential features of the methods of welding hereinbefore described. Thus, for example, as hereinbefore stated, the retardation or damping of the movement of the stud towards the plate in apparatus in which such movement is effected by spring action may be secured by the provision of a pneumatic or fluid pressure dashpot or by the use of a train of gear wheels one of which is in mesh with a rack that partakes of the movement of the stud carrier. Thus, the rack may be connected to the solenoid core by a rigid wire of brass or other non-magnetic material that passes axially through a hole at the centre of the arc limiting device.

I claim:

1. A method of welding metal studs, tubes and the like, being articles of small cross-sectional area, to metal plates, bodies and the like, being articles of large surface area, and more particularly steel and steel alloy studs to steel and steel alloy plates and the like, consisting in effecting the instantaneous and uniform formation of an arc between the stud and the plate, maintaining the arc through a predetermined period, then moving the stud to the plate against resistance sufficient to retard the movement and to prevent violent contact of the stud with the plate and thereby to minimize impact, pressing the stud into contact with the plate and at a moment not later than the instant of contact of the stud with the plate moderating the current passing through the stud so as to ensure that on contact between the heated stud and the heated plate the heat of the arc crater of the plate is sufficient only to maintain the metal of the plate at the crater in a suitably plastic or fluid, but not molten, condition although the contacting end of the stud is relatively molten, and maintaining the passage of current through the stud until the weld is completed.

2. A method of welding metal studs and the like to metal plates and the like, consisting in connecting the stud and the plate in circuit with a direct current supply, effecting the instantaneous and uniform formation of an arc between the stud and the plate, maintaining the arc through a predetermined period, then moving the stud to the plate against resistance sufficient to retard the movement and to prevent violent contact of the stud with the plate and thereby to minimize impact, pressing the stud into contact with the plate and at a moment not later than the instant of contact of the stud with the plate reducing at the source of supply the welding current passing through the stud so as to ensure that on contact between the heated stud and the heated plate the heat of the arc crater of the plate is sufficient only to maintain the metal of the plate at the crater in a suitably plastic or fluid, but not molten, condition although the contacting end of the stud is relatively molten, and maintaining the passage of current through the stud until the weld is completed.

3. A method for the direct current welding of metal studs and the like to metal plates and the like, consisting in effecting the instantaneous and uniform formation of an arc between the stud and the plate, maintaining the arc through a predetermined period, then moving the stud to the plate against resistance sufficient to retard the movement and to prevent violent contact of the stud with the plate and thereby to minimize impact, pressing the stud into contact with the plate and at a moment not later than the instant of contact of the stud with the plate increasing the welding circuit resistance to moderate the current passing through the stud so as to ensure that on contact of the heated stud with the heated plate the heat of the arc crater of the plate is sufficient only to maintain the metal of the plate at the crater in a suitably plastic or fluid, but not molten, condition although the contacting end of the stud is relatively molten, and maintaining the passage of current through the stud until the weld is completed.

4. A method of welding according to claim 1, consisting in striking the arc between the stud and the plate with the stud in fixed and spaced relation from the plate and with a fusible insert bridging the space and contacting both the stud and the plate.

5. A method of welding according to claim 1, consisting in striking the arc between the stud and the plate with the stud in fixed and spaced relation from the plate and the space between the stud and the plate bridged by a pellet or wad of fibrous material held in contact both with the stud and the plate and fusing upon the flow of the welding current through it to effect the instantaneous and uniform formation of the arc.

HAROLD MARTIN.

REFERENCES CITED

The following references are of record in the file of this patent:

UNITED STATES PATENTS

| Number | Name | Date |
|---|---|---|
| Re. 16,012 | Holslag | Mar. 3, 1925 |
| Re. 22,411 | Nelson | Dec. 21, 1943 |
| 1,146,988 | Arendt | July 20, 1915 |
| 1,359,620 | Ritchey et al. | Nov. 23, 1920 |
| 1,410,421 | Steele et al. | Mar. 21, 1922 |
| 1,485,744 | Turbayne | Mar. 4, 1924 |
| 1,916,012 | Otto et al. | June 27, 1933 |
| 1,916,013 | Otto et al. | June 27, 1933 |
| 1,948,377 | Hacker | Feb. 20, 1934 |
| 1,976,342 | Heineman | Oct. 9, 1934 |
| 1,995,001 | Ito | Mar. 19, 1935 |
| 2,018,263 | Ito | Oct. 22, 1935 |
| 2,018,380 | Pfeiffer | Oct. 22, 1935 |
| 2,085,049 | Spire | June 29, 1937 |
| 2,096,495 | Hogg | Oct. 19, 1937 |
| 2,110,832 | Hogg | Mar. 8, 1938 |
| 2,115,707 | Crecca et al. | May 3, 1938 |
| 2,157,858 | Miller | May 9, 1939 |
| 2,191,494 | Nelson | Feb. 27, 1940 |
| 2,234,855 | Rehse | Mar. 11, 1941 |
| 2,265,169 | Hughes et al. | Dec. 9, 1941 |
| 2,315,502 | Crecca et al. | Apr. 6, 1943 |
| 2,319,977 | Cape et al. | May 25, 1943 |

FOREIGN PATENTS

| Number | Country | Date |
|---|---|---|
| 194,634 | Great Britain | Mar. 15, 1923 |

OTHER REFERENCES

The Welding Encyclopedia, eighth edition, 1932, page 267, The Welding Engineer Publishing Co., 608 Dearborn Street, Chicago, Illinois.